United States Patent [19]

Schmitt

[11] Patent Number: 5,122,550

[45] Date of Patent: Jun. 16, 1992

[54] CELLULOSE ESTER FIBRILS: A MOLDING AID FOR FRICTION MATERIALS

[75] Inventor: Thomas E. Schmitt, Charlotte, N.C.

[73] Assignee: Hoechst Celanese Corporation, Somerville, N.J.

[21] Appl. No.: 616,481

[22] Filed: Nov. 21, 1990

[51] Int. Cl.$^5$ .............................. C08K 3/04
[52] U.S. Cl. ......................... 523/149; 523/152; 523/153; 523/155; 523/156; 523/157; 523/158
[58] Field of Search ............... 523/149, 152, 153, 155, 523/156, 157, 158

[56] References Cited

U.S. PATENT DOCUMENTS

| | | | |
|---|---|---|---|
| 3,842,007 | 10/1974 | Caputi et al. | 210/65 |
| 3,856,120 | 12/1974 | Kwoiek et al. | 188/251 |
| 3,959,194 | 5/1976 | Adelmann | 523/158 |
| 3,961,007 | 6/1976 | Caputi et al. | 264/140 |
| 4,047,862 | 9/1977 | Keith | 425/8 |
| 4,125,496 | 11/1978 | McGinnis | 268/17 |
| 4,137,214 | 1/1979 | Sochaiski | 260/38 |
| 4,192,838 | 3/1980 | Keith et al. | 264/10 |
| 4,217,255 | 8/1980 | Griffith | 523/156 |
| 4,219,452 | 8/1980 | Littlefield | 260/3 |
| 4,226,758 | 10/1980 | Sumira | 260/38 |
| 4,226,759 | 10/1980 | Chester | 260/38 |
| 4,278,584 | 7/1981 | Noguchi | 260/38 |
| 4,374,211 | 2/1983 | Gallagher et al. | 523/156 |
| 4,460,647 | 7/1984 | Keith | 428/369 |
| 4,483,947 | 11/1984 | Jakob et al. | 523/156 |
| 4,497,915 | 2/1985 | Höroldt et al. | 523/156 |
| 4,866,107 | 9/1989 | Dorsee et al. | 523/153 |

*Primary Examiner*—Paul R. Michl
*Assistant Examiner*—Edward Cain
*Attorney, Agent, or Firm*—R. H. Hammer, III.

[57] ABSTRACT

A non-asbestos friction material composition suitable for use as a friction element includes: a binder; a reinforcing material; and a structural integrity imparting amount of cellulose ester fibrils.

9 Claims, No Drawings

CELLULOSE ESTER FIBRILS: A MOLDING AID FOR FRICTION MATERIALS

FIELD OF THE INVENTION

Cellulose ester fibrils (also referred to as "fibrets") are used as a molding aid for friction materials, such as brake pads, clutch plates and the like.

BACKGROUND OF THE INVENTION

The replacement of asbestos in conventional friction products is desirable because of the suspected health and safety hazards linked to the human contact of asbestos. Various approaches to the replacement of asbestos in friction products have led to a substantial body of art that has been categorized into three groups of non-asbestos type formulations. They are: (1) semi-metallic formulations; (2) organic non-asbestos formulations; and (3) cold molding hydrocarbon formulations. Such categories are generally illustrated in U.S. Pat. Nos. 3,856,120; 4,137,214; and 4,125,496, respectively. Additional examples of these non-asbestos formulations may be found in U.S. Pat. Nos. 4,278,584; 4,226,758; 4,226,759; and 4,219,452.

The elimination of asbestos from friction material formulations has created a substantial manufacturing problem. In conventional friction product manufacture, the components of the friction product are typically mixed, formed into a preform (or "green mold") at ambient temperatures, and then subjected to simultaneous pressure and heat curing, and finally to oven curing thereby obtaining the final friction product. Asbestos-based formulations, when in the preform stage, have sufficient structural integrity to withstand normal handling and storage prior to the hot molding process. But non-asbestos formulations do not possess acceptable structural integrity so as to be able to withstand subsequent handling and storage without breakage.

U.S. Pat. Nos. 4,374,211 and 4,866,107 are directed to the solution of the above problem, that is increasing the structural integrity of non-asbestos friction product formulation preforms. In U.S. Pat. No. 4,374,211, the structural integrity of the preforms is increased by the addition of an aramid polymer in the form of a pulp fiber. In U.S. Pat. No. 4,866,107, the same result is obtained by the use of a fibrillated acrylic polymer fiber.

SUMMARY OF THE INVENTION

The instant invention is directed to a non-asbestos friction material composition suitable for use as a friction element comprising: a binder; a reinforcement material; and a structural integrity imparting amount of cellulose ester fibrils.

DETAILED DESCRIPTION OF THE INVENTION

It has been discovered that the addition of cellulose ester fibrils to non-asbestos friction product formulations can, among other things, increase the structural integrity of the preforms made from those formulations. Furthermore, the addition of wet cellulose ester fibrils can reduce "dusting" of any asbestos or non-asbestos friction product formulation.

Cellulose ester fibrils are well known. See, for example, U.S. Pat. Nos. 3,842,007; 4,047,862; and 4,460,647, all of which are incorporated herein by reference. Methods of making these cellulose ester fibrils are also well known. See, for example, U.S. Pat. Nos. 3,961,007; 4,047,862; 4,192,838; and 4,460,647, each of these patents are incorporated herein by reference.

Cellulose ester may include, for example, cellulose formate, cellulose butyrate, cellulose propionate, cellulose acetate propionate, cellulose acetate, cellulose triacetate, cellulose acetate butyrate, benzyl cellulose, or mixtures thereof. Cellulose acetate is preferred and shall be discussed in detail hereinafter. Cellulose ester fibrils refer to a high surface area, cellulose ester fibrillar material having surface areas in excess of 5.0 square meters per gram, lengths of less than 1000 microns, and diameters of from about 0.2 to 90 microns. The surface area of fibrillar material is measured in accordance with Nelson, F. and Eggertment, F. T., "Determination of Surface Area Adsorption Measurements by a Continuous Flow Method", *Analytical Chemistry*, Vol. 30, No. 3, pp 1387-1390, August, 1958, incorporated herein by reference. Preferably, cellulose ester fibrils have a surface area of about 20 square meters per gram, lengths of about 20-200 microns, and diameters of about 0.5-5 microns. Cellulose ester fibrils marketed under the tradename "Fibrets" are commercially available from the Hoechst Celanese Corporation of Charlotte, N.C. These fibrets are normally supplied at about 15% solids, and may be used wet or dry in the non-asbestos friction product formulations discussed herein.

Wet cellulose ester fibrils when added to the dry formulations of friction materials, i.e. non-asbestos and asbestos formulations, have the ability to reduce dusting. In asbestos formulations, reduced dusting means that less or no free asbestos will contaminate the air surrounding the manufacturing process. In all friction product formulation, reduced dusting means that the manufacturing process will be cleaner.

The specific characterization of cellulose acetate fibrils in various non-asbestos friction product formulations at the preform stage of manufacture shall be discussed hereinafter. Thereafter is a discussion of the various non-asbestos friction product formulations.

Non-asbestos friction material compositions, according to the instant invention, generally comprises a binder; a reinforcing material; and a structural integrity imparting amount of cellulose ester fibrils The binder and reinforcing materials are known in the art and are discussed hereinafter with reference to specific non-asbestos friction material compositions. Structural integrity imparting amounts of cellulose ester fibrils mean at least an amount of cellulose ester fibrils greater than or equal to about 0.5% by weight of the composition. The upper limit may be as high as or higher than 30% by weight. This upper limit is defined, in part, by economics and, in part, by the physical requirements of the end product. A range of about 0.5% to about 8% by weight is preferred.

In organic non-asbestos formulations, a minimum threshold of about 3% by weight of the cellulose acetate fibrils appears to be required so that the preform has sufficient structural integrity. At the loading of 3% by weight, the preform made with cellulose acetate fibrils have acceptable structural integrity and are equivalent to those with Kevlar pulp (KEVLAR is the registered trademark of DuPont) and acrylic pulp; even though, the cellulose acetate containing preforms are slightly weaker at 1.2 pounds in terms of peak strength, than the Kevlar (1.9 pounds) or acrylic (2.4 pounds) based preforms Nevertheless, by increasing the weight percentage of the cellulose acetate fibril from 3% to 8%, the preform strength may be increased from 1.2 pounds to 8.6 pounds. In general, the use of wet cellulose acetate fibrils (e.g., fibrets are typically supplied at about 15% solids), even at 2% by weight, improves the flexural strength of the preform over the use of dry cellulose acetate fibrils, dry Kevlar pulp and dry acrylic pulp.

Dusting is also a problem encountered in the manufacture of organic non-asbestos preforms The use of wet cellulose acetate fibrils significantly reduces dusting even at concentration levels as low as 2% by weight. The use of dry cellulose acetate fibrils appears to have the same effect on dust control at mixing as dry Kevlar and acrylic pulps, however, at cellulose acetate fibril concentrations of 5% by weight or more, dusting is eliminated In semi-metallic formulations, a minimum threshold of about 0.5% by weight of the dry cellulose acetate fibrils appears to be required so that the preform has sufficient structural integrity At the loading of about 2% by weight, the preform made with cellulose acetate fibrils appears to be equivalent to those containing Kevlar or acrylic pulp; however, the cellulose acetate fibril preform has a greater peak strength (8.1 pounds) than preforms made with Kevlar (6.6 pounds) or acrylic (6.8 pounds) pulp. Moreover, by increasing the cellulose acetate fibril content of the preform from 0.5 to 8% by weight, the preform's strength is increased from 1.2 pounds to 46.5 pounds. Either wet or dry cellulose acetate fibrils may be used, but the use of wet fibrils results in a significant improvement in flexural strength.

When dry cellulose acetate fibrils are used in semi-metallic formulations, dusting was greatly reduced, but not eliminated by increasing the concentration from 5% to 8% by weight. Wet cellulose acetate fibrils eliminated the dusting problems at a 2% by weight concentration Three general categories of non-asbestos type friction materials have involved in the art. They are semi-metallic materials, organic non-asbestos materials, and hydrocarbon cold-forming materials.

Semi-metallic systems typically include phenolic resins; carbonaceous particles such as graphite or carbon particles; non-asbestos fibers such as those of steel, ceramic, or carbon; ceramic powders such as those of magnesium oxide, zircon, mullite and alumina; metal powders such as those of iron, copper, brass, and stainless steel; and other modifiers such as elastomers and inorganic wear fillers.

Semi-metallic systems typically may contain the following amounts of the above constituents:

| Ingredient | Wt. % |
|---|---|
| Phenolic Resin | 4-13 |
| Graphite or Carbon Particles | 15-40 |
| Fibers (1) | 0-25 |
| Ceramic Powders (2) | 2-10 |
| Metal Powders (3) | 15-40 |
| Other Modifiers (4) | 0-20 |

(1) steel, ceramic or carbon fibers
(2) magnesium oxide, zircon, mullite, alumina
(3) iron, copper, brass, stainless steel
(4) elastomers, inorganic wear fillers In the manufacture of friction elements, the semi-metallic friction material constituents are mixed together to form a homogeneous mixture. The mixture is then pressed into preforms. The preforms are then transferred to a second press where pressure and heat are simultaneously applied, causing the resin to melt and flow throughout the piece forming a continuous matrix for holding the other ingredients. The lining pads are then transferred to curing ovens and cured at temperatures ranging from 300° to 600° F. to further set the resins.

Organic non-asbestos systems typically include a thermosetting resin; cashew particles; non-asbestos fibers; and more than 20% by weight of a powdered inorganic compound having a Moh's hardness rating of greater than 2 and less than 5 and capable of being subjected to temperatures of greater than about 425° C. without substantial chemical or physical alteration. Such components are described in greater detail in U. S. Pat. No. 4,137,214 which is hereby incorporated by reference herein for the purpose of such additional description. Organic non-asbestos systems typically may contain the following amounts of the above ingredients:

| Ingredients | Wt. % |
|---|---|
| Thermosetting Resin | 10-30 |
| Cashew Nut Particles | 5-25 |
| Non-asbestos Fibers | 5-15 |
| Inorganic Compound | 20-60 |

Another so-called organic non-asbestos friction material is disclosed in U. S. Pat. No. 4,278,584. This patent discloses the following general formulation:

| Ingredients | Wt. % |
|---|---|
| Phenol-formaldehyde Resin | 6-12 |
| Carbon Fibers | 10-40 |
| Steel Fibers | 30-60 |
| Inorganic and/or Organic Fibers | 10-20 |

Friction elements may be typically manufactured from organic non-asbestos mixtures by placing a quantity of the mixture in a mold and pressing at 1200 psi with a 10 second dwell time in the mold to form a preform and then curing the preform at 300° F. for 15 minutes at 4000 psi with degassing at the end of one and 2.5 minutes. The edges of the cured preform are then trimmed to remove excess material and the preform post-baked while under constraint in a forming container to prevent swelling for a period of 8 hours. The temperature is increased linearly over a period of 1.5 hours to 400° F. and then held at that point for the remaining period.

Hydrocarbon cold forming friction materials of the non-asbestos type may typically include at least two systems. The first system includes non-asbestos inorganic fibers, cellulose fibers, optionally carbon and/or graphite particles, and a thermosetting organic binder comprising a hydroxyl terminated butadiene copolymer of the formula

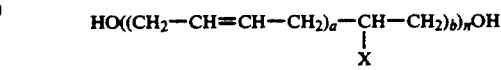

wherein "X" is phenyl or CN, "a" has a value of from 0.05 to 0.95, "b" has a value of from 0.005 to 0.5, and "n" is an integer from about 10 to 140; the binder having been cured with from about 0.1 to about 5 percent of a peroxide catalyst.

A second non-asbestos hydrocarbon cold forming system includes metallic materials, graphite particles bonded together when a thermosetting hydroxyl butadiene copolymer of the formula:

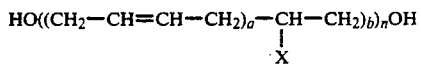

wherein "X" is phenyl or CN, "a" has a value of from 0.5 to 0.95, "b" has a value of from 0.005 to 0.5, and "n" is an integer from about 10 to about 140; the copolymer having been cured with from about 0.02 to about 12.5 percent of a peroxide catalyst.

The components mentioned above for both systems are discussed in greater detail in U. S. Pat. No. 4,125,496 which is hereby incorporated by reference for the purpose of such additional description.

The above-mentioned systems typically may contain the following amounts of the above constituents:

|  | Wt. % |
|---|---|
| First System | |
| Ingredient | |
| Inorganic fibers | 20–70 |
| Cellulose fibers | 5–25 |
| Coke Particles | 0–15 |
| Graphite Particles | 0–10 |
| Carbon Black | 0–15 |
| Thermosetting Organic Binder | 10–60 |
| Second System | |
| Ingredient | |
| Metallic Material (1) | 15–75 |
| Graphite Particles | 5–20 |
| Thermosetting Organic Binder | 2–50 |

(1) Metal fibers, metal powder of admixture

In the manufacture of friction elements, hydrocarbon cold molding formulations are typically uniformly mixed and then cold molded at pressures on the order of 2000 to 5000 psi to form a preform.

Curing of the preform can be accomplished by heating at elevated temperatures on the order of about 350° to about 600° F. for a period of several hours.

EXAMPLES

In the following examples, the components for each formulation were dry blended in a Littleford mixer for 15 minutes to ensure thorough blending of all components. Each formulation was molded at ambient temperature into the preform shape of a disc brake pad by a hydraulic press utilizing 4000 psi of pressure for 4 seconds.

Finally, preformed friction product formulations were tested for flexural strength. The flexural strength test procedure was a three-point loading system that is a modification of ASTM-D-790-80. The apparatus used was a Sintech Model 20 Computerized Systems for Material Testing equipped with TESTWORKS Program 135. The loading nose and supports were cylindrical surfaces with one inch diameters to avoid indentation or failure due to stress concentration directly under the nose. The procedure is as follows: each specimen tested was measured for width and depth to the nearest 0.01 inch; the support span was a constant 2.5 inches and the crosshead speed was 0.20 inches per minutes; the loading nose and supports were aligned so that the cylindrical surfaces were parallel and the loading nose was midway between the supports; thereafter, the load was applied to the specimen at the specified rate and the load deflection data was recorded in terms of cross head displacement (final displacement occurred when the specimen ruptured). The following calculations were made:

Flexural strength (maximum stress at rupture)

$$S = 3PL/2bd^2$$

where:
S = stress at the outer layer at mid span (psi)
P = peak load (lbf)
L = support span (inches)
b = width of preform (inches)
d = depth of preform (inches).

Flexual modulus (tangent modulus of elasticity in bending)

$$E_B = L^3 m/4bd^3$$

where:
$E_B$ = modulus of elasticity in bending (psi)
L = support span (inches)
b = width of perform (inches)
d = depth of perform (inches)
m = slope of the tangent to the initial straight-line portion of the load-deflection curve, lbf/inch of deflection.

Maximum Stain at the outer layer at the midspan $$r = 6Dd/L^2$$

where:
r = maximum strain in the outer layer (inches/inch)
D = maximum deflection of the center of the preform (inch)
L = support span (inch)
d = depth of preform (inch)

The following tables set forth the experimental work regarding the instant invention.

In Table 1, a representative non-metallic, non-asbestos friction product formulation (i.e., "organic non-asbestos formulation") is set forth with no processing aid (test formulation number (tfn) 1); various amounts of cellulose acetate fibrets (tfn's 2–6, 19A, 19B, 20, 21, 21A); and various amounts of Kevlar pulp (tfn's 7, 7A) or acrylic fiber (tfn's 8, 8A).

In Table 2, a representative semi-metallic, non-asbestos friction product formulation is set forth with no processing aid (tfn 9); various amounts of cellulose acetate fibrets (tfn's 12–16, 22, 22A); and amounts of Kevlar pulp (tfn 10) or acrylic fiber (tfn 11).

In Table 3, the results and observations of preforming and testing for the formulations set forth in Table 1 are presented.

In Table 4, the results and observations of preforming and testing for the formulations set forth in Table 2 are presented.

TABLE 1

NON-METALLIC FORMULATIONS

| INGREDIENTS | #1 | #2 | #3 | #4 | #5 | #6 | #7 | #7A | #8 | #8A | #19A | #19B | #20 | #21 | #21A |
|---|---|---|---|---|---|---|---|---|---|---|---|---|---|---|---|
| Phenolic Resin | 12 | 12 | 12 | 12 | 12 | 12 | 12 | 12 | 12 | 12 | 12 | 12 | 12 | 12 | 12 |
| Wollastonite | 22 | 22 | 22 | 22 | 22 | 22 | 22 | 22 | 22 | 22 | 22 | 22 | 22 | 22 | 22 |
| Fiberfax or mineral fiber | 26 | 26 | 26 | 26 | 26 | 26 | 26 | 26 | 26 | 26 | 26 | 26 | 26 | 26 | 26 |
| Rubber | 6 | 6 | 6 | 6 | 6 | 6 | 6 | 6 | 6 | 6 | 6 | 6 | 6 | 6 | 6 |
| Barium Sulfate | 22 | 22 | 22 | 22 | 22 | 22 | 22 | 22 | 22 | 22 | 22 | 22 | 22 | 22 | 22 |
| Magnesium Oxide | 2 | 2 | 2 | 2 | 2 | 2 | 2 | 2 | 2 | 2 | 2 | 2 | 2 | 2 | 2 |
| Cashew Particle | 8 | 8 | 8 | 8 | 8 | 8 | 8 | 8 | 8 | 8 | 8 | 8 | 8 | 8 | 8 |
| Kevlar Pulp | 0 | 0 | 0 | 0 | 0 | 0 | 2 | 3 | 0 | 0 | 0 | 0 | 0 | 0 | 0 |
| Acrylic Fiber | 0 | 0 | 0 | 0 | 0 | 0 | 0 | 0 | 2 | 3 | 0 | 0 | 0 | 0 | 0 |
| CA Fibrets | 0 | 0.5 | 1 | 2 | 5 | 8 | 0 | 0 | 0 | 0 | 2.5 | 3 | 3.5 | 2, WET | 2, WET, AIR DRIED |
| TOTAL PARTS | 98 | 98.5 | 99 | 100 | 103 | 106 | 100 | 101 | 100 | 101 | 100.5 | 101 | 101.5 | 100 | 100 |

TABLE 2

SEMI-METALLIC FORMULATIONS

| INGREDIENTS | #9 | #10 | #11 | #12 | #13 | #14 | #15 | #16 | #22 | #22A |
|---|---|---|---|---|---|---|---|---|---|---|
| Steel Fiber | 20 | 20 | 20 | 20 | 20 | 20 | 20 | 20 | 20 | 20 |
| Sponge Iron | 26 | 26 | 26 | 26 | 26 | 26 | 26 | 26 | 26 | 26 |
| Graphite | 10 | 10 | 10 | 10 | 10 | 10 | 10 | 10 | 10 | 10 |
| Phenolic Resin | 8 | 8 | 8 | 8 | 8 | 8 | 8 | 8 | 8 | 8 |
| Rubber | 4 | 4 | 4 | 4 | 4 | 4 | 4 | 4 | 4 | 4 |
| Magnesium Oxide | 2 | 2 | 2 | 2 | 2 | 2 | 2 | 2 | 2 | 2 |
| Cashew Particle | 4 | 4 | 4 | 4 | 4 | 4 | 4 | 4 | 4 | 4 |
| Barium Sulfate | 24 | 24 | 24 | 24 | 24 | 24 | 24 | 24 | 24 | 24 |
| Kevlar Pulp | 0 | 2 | 0 | 0 | 0 | 0 | 0 | 0 | 0 | 0 |
| Acrylic Fiber | 0 | 0 | 2 | 0 | 0 | 0 | 0 | 0 | 0 | 0 |
| CA Fibrets | 0 | 0 | 0 | 0.5 | 1 | 2 | 5 | 8 | 2, WET | 2, WET, HOT AIR DRIED |
| TOTAL PARTS | 98 | 100 | 100 | 98.5 | 99 | 100 | 103 | 106 | 100 | 100 |

TABLE 3

PREFORM PERFORMANCE OF NON-METALLIC FORMULATIONS

| PREFORM BINDER, % | #1 | #2 | #3 | #4 | #5 | #6 | #19A | #19B | #20 | #21 | #21A |
|---|---|---|---|---|---|---|---|---|---|---|---|
| CA fibrets | 0 | 0.5 | 1 | 2 | 5 | 8 | 2.5 | 3 | 3.5 | 2 | 2 |
| Kevlar pulp | 0 | 0 | 0 | 0 | 0 | 0 | 0 | 0 | 0 | 0 | 0 |
| Acrylic pulp | 0 | 0 | 0 | 0 | 0 | 0 | 0 | 0 | 0 | 0 | 0 |
| BINDER CONDITION: | | pre-dried | pre-dried | pre-dried | pre-dried | pre-dried | pre-dried | pre-dried | pre-dried | wet, | wet, air d. |
| PREFORMED? | no | no | no | mar. | yes | yes | yes | yes | yes | yes | yes |
| RATING | | | | poor | good | excel | fair | fair-good | good | good-v.g. | very good |
| COMMENTS: | dust | dust | dust | sli. dust | no dust | no dust | sli. dust | sli. dust | sli. dust | no dust | no dust |
| 3-POINT FLEX | | | | | | | | | | | |
| Peak load, lbs | N.T. | N.T. | N.T. | N.T. | 4.0 | 8.6 | N.T. | 1.2 | 2.2 | 6.7 | 59.3 |
| Flex Str., psi | N.T. | N.T. | N.T. | N.T. | 4.9 | 10.9 | N.T. | 1.4 | 2.5 | 11.0 | 87.7 |
| % Strain at Bk. | N.T. | N.T. | N.T. | N.T. | 33.6 | 17.9 | N.T. | 19.2 | 14.4 | 11.7 | 11.1 |
| Flex Mod., psi | N.T. | N.T. | N.T. | N.T. | 26.3 | 65.7 | N.T. | 8.3 | 19.6 | 105.6 | 1028. |
| Sample thick., in. | | | | | 1.45 | 1.40 | | 1.50 | 1.48 | 1.23 | 1.30 |
| N = | 0 | 0 | 0 | 0 | 6 | 6 | 0 | 7 | 6 | 6 | 1 |
| PARTICLE SIZE Sur. Area, m²/g | — | 19.0 | 19.0 | 19.0 | 19.0 | 19.0 | 19.0 | 19.0 | 19.0 | 19.0 | 19.0 |

TABLE 4

PREFORM PERFORMANCE OF SEMI-METALLIC FORMULATIONS

| PREFORM BINDER, % | #9 | #10 | #11 | #12 | #13 | #14 | #15 | #16 | #22 | #22A |
|---|---|---|---|---|---|---|---|---|---|---|
| CA fibrets | 0 | 0 | 0 | 0.5 | 1 | 2 | 5 | 8 | 2 | 2 |
| Kevlar pulp | 0 | 2 | 0 | 0 | 0 | 0 | 0 | 0 | 0 | 0 |
| Acrylic pulp | 0 | 0 | 2 | 0 | 0 | 0 | 0 | 0 | 0 | 0 |
| BINDER CONDITION: | | as rec. | as rec. | pre-dried | pre-dried | pre-dried | pre-dried | pre-dried | wet | wet, hot d. |
| PREFORMED? | no | yes | yes | yes | yes | yes | yes | yes | yes | yes |
| RATING | | v. g. | v. g. | fair- | v. g. | v. g. | v. g. | v. g. | v. g. | v. g. |

TABLE 4-continued

| PREFORM | PREFORM PERFORMANCE OF SEMI-METALLIC FORMULATIONS | | | | | | | | | |
|---|---|---|---|---|---|---|---|---|---|---|
| | TEST FORMULATION NUMBER | | | | | | | | | |
| BINDER, % | #9 | #10 | #11 | #12 | #13 | #14 | #15 | #16 | #22 | #22A |
| COMMENTS: | dust | dust | dust | good dust | dust | dust | sli. dust | sli. dust | no dust | no dust |
| 3-POINT FLEX | | | | | | | | | | |
| Peak load, lbs | N.T. | 6.6 | 6.8 | 1.2 | 3.4 | 8.1 | 25.6 | 46.5 | 125.6 | 144.8 |
| Flex Str., psi | N.T. | 9.0 | 8.7 | 2.0 | 5.9 | 12.0 | 36.5 | 59.3 | 227.4 | 239.6 |
| % Strain at Bk. | N.T. | 17.8 | 35.6 | 6.4 | 7.8 | 12.0 | 13.0 | 15.4 | 7.2 | 13.3 |
| Flex Mod., psi | N.T. | 58.8 | 30.7 | 37.6 | 87.5 | 109.9 | 301.6 | 413.3 | 3299.7 | 1942.0 |
| Sample Thick., in. | | 1.35 | 1.40 | 1.20 | 1.20 | 1.30 | 1.33 | 1.40 | 1.18 | 1.23 |
| N = | 0 | 6 | 6 | 3 | 6 | 6 | 6 | 6 | 6 | 3 |
| PARTICLE SIZE | | | | | | | | | | |
| Sur. Area, m$^2$/g | — | 7.6 | 60.9 | 19.0 | 19.0 | 19.0 | 19.0 | 19.0 | 19.0 | 19.0 |

We claim:

1. A non-asbestos friction material composition suitable for use as a friction element consisting of: a binder; a reinforcing material selected from the group consisting of carbonaceous particles, steel fibers, ceramic fibers, carbon fibers, metal powders, elastomers, inorganic fillers, cashew particles, powdered inorganic compounds, coke particles, carbon black, and mixtures thereof; and a structural integrity imparting amount of cellulose ester fibrils.

2. The non-asbestos friction material composition according to claim 1 wherein said structural integrity imparting amount of cellulose ester fibrils is greater than or equal to about 0.5% by weight of the composition.

3. The non-asbestos friction material composition according to claim 1 wherein said structural integrity imparting amount of cellulose ester fibrils ranges from about 0.5% to about 8.0% by weight of the composition.

4. The non-asbestos friction material composition according to claim 1 wherein said cellulose ester fibrils are selected from the group consisting of cellulose formate, cellulose butyrate, cellulose propionate, cellulose acetate propionate, cellulose acetate, cellulose triacetate, cellulose acetate butyrate, benzyl cellulose, or mixtures thereof.

5. The non-asbestos friction material composition according to claim 1 where in said cellulose ester fibrils are cellulose acetate fibrils.

6. The non-asbestos friction material composition according to claim 1 wherein said cellulose ester comprises a cellulose ester fibrillar material having surface areas in excess of about 5.0 square meters per gram.

7. The non-asbestos friction material compositions according to claim 1 wherein the compositions are selected from the group consisting of semi-metallic formulations, organic non-asbestos formulations, and hydrocarbon cold forming formulations.

8. The non-asbestos friction material composition according to claim 7 wherein said semi-metallic formulation comprises at least 0.5% by weight of said structural integrity imparting amount of cellulose ester fibrils.

9. The non-asbestos friction material composition according to claim 7 wherein said organic non-asbestos formulation comprises at least 3.0% by weight of said structural integrity imparting amount of cellulose ester fibrils.

* * * * *